Jan. 4, 1938. I. G. JOHNSON ET AL 2,104,041
BUTTER DISPENSER
Filed Dec. 24, 1935 4 Sheets—Sheet 1

WITNESSES
Edw. Thorpe
S.W. Foster

INVENTORS
Irene Grant Johnson
Winfred N. Lurcott
BY Munn, Anderson & Liddy
ATTORNEYS Jan. 4, 1938.    I. G. JOHNSON ET AL    2,104,041
BUTTER DISPENSER
Filed Dec. 24, 1935    4 Sheets-Sheet 2
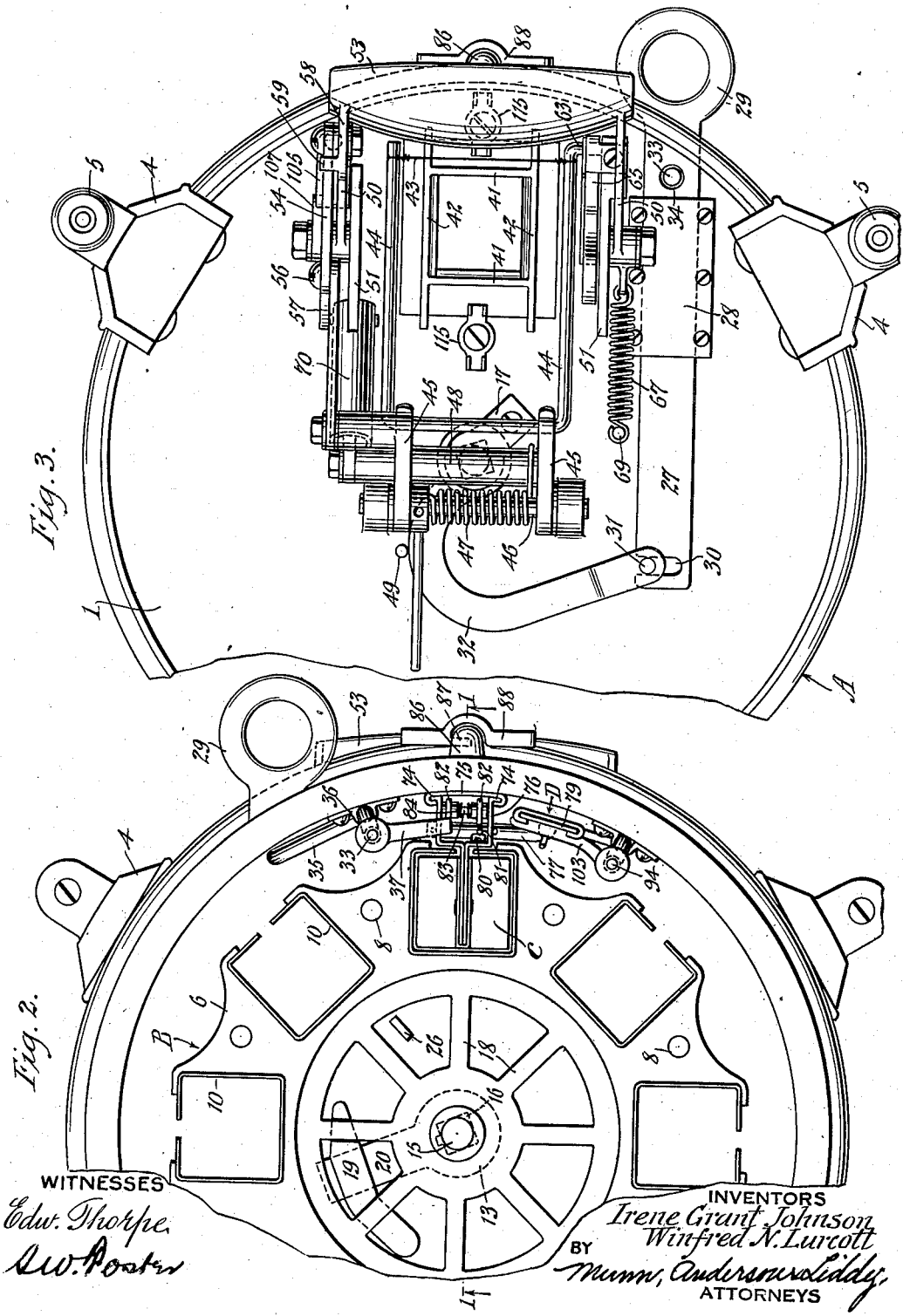
WITNESSES
Edw. Thorpe
D. W. Foster
INVENTORS
Irene Grant Johnson
Winfred N. Lurcott
BY
Munn, Anderson & Liddy
ATTORNEYS Jan. 4, 1938.                I. G. JOHNSON ET AL                2,104,041
                                BUTTER DISPENSER
                             Filed Dec. 24, 1935          4 Sheets-Sheet 3

WITNESSES
Edw. Thorpe
A. W. Foster

INVENTORS
Irene Grant Johnson
Winfred N. Lurcott
BY Munn, Anderson & Liddy
ATTORNEYS Jan. 4, 1938.                I. G. JOHNSON ET AL                2,104,041
                                BUTTER DISPENSER
                         Filed Dec. 24, 1935        4 Sheets-Sheet 4
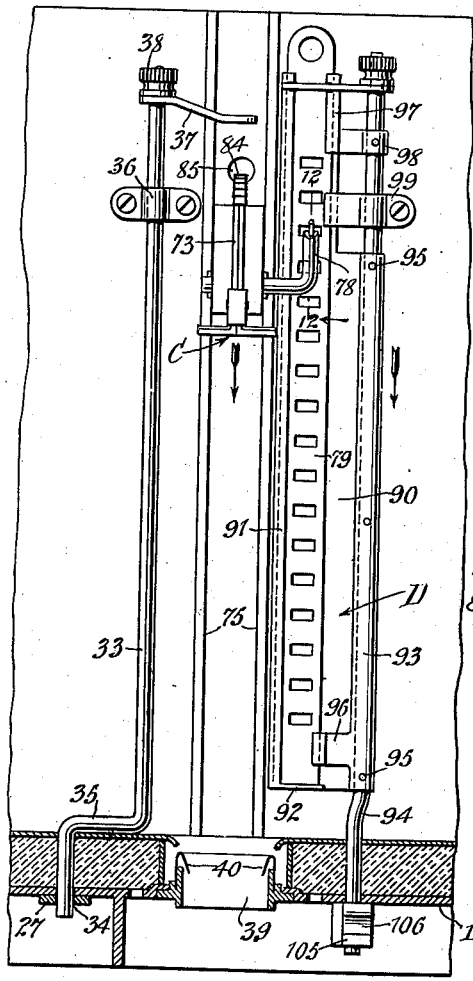
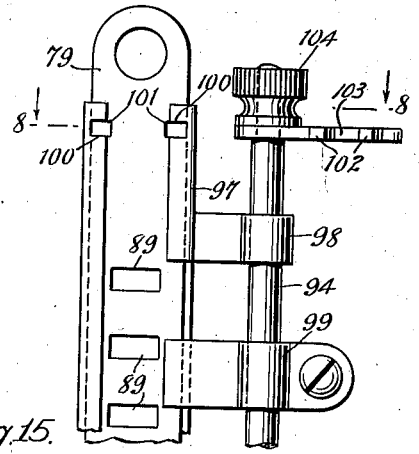
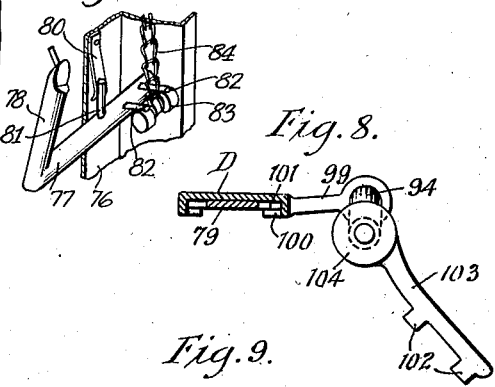
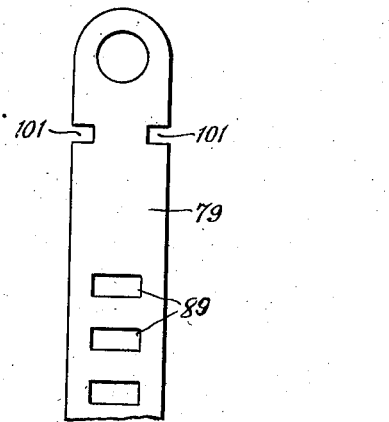
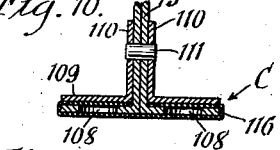
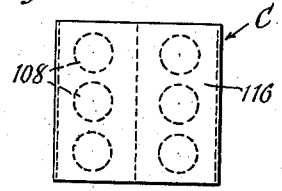
WITNESSES
Edw. Thorpe
A. W. Foster
INVENTORS
Irene Grant Johnson
Winfred N. Lurcott
BY Munn, Anderson & Liddy
ATTORNEYS Patented Jan. 4, 1938

2,104,041

UNITED STATES PATENT OFFICE 2,104,041

BUTTER DISPENSER

Irene Grant Johnson, Brooklyn, N. Y., and Winfred N. Lurcott, Elizabeth, N. J.; said Lurcott assignor to said Johnson Application December 24, 1935, Serial No. 56,110

16 Claims. (Cl. 31—21)

This invention relates to butter dispensers, an object of the invention being to provide a device or machine of this character from which pieces or "pats" of butter are dispensed one at a time and dropped upon a plate which is utilized to operate the machine.

A further object is to provide a machine of this character in which a large quantity of butter is housed and maintained at the desired temperature, and which is especially adapted for use in hotels, dining rooms, restaurants, and the like, permitting the waiters to obtain pats of butter without contacting the hands with the butter.

A further object is to provide a machine of this character which greatly facilitates the serving of pats of butter, which results in a great saving to the proprietor because there is no waste and no spoilage.

The machine includes a novel container having a novel arrangement of rotary turret containing a circular series of channel-like receptacles for bars or columns of butter, one of which at a time is in registry with a die at the bottom of the container, through which a predetermined length of the bar or column is projected and cut off by the operation of a novel construction and arrangement of cutting means operated by pressure of a plate against the same to cause a pat of butter to be cut from the lower end of the column and drop upon the plate.

The machine further includes novel means for feeding a column or bar of butter downwardly through the die, improved means for indicating the amount of butter dispensed, or, in other words, the height of the column being dispensed, and improved means for turning the turret to bring another column into registry with the die, said last-mentioned means including a locking device preventing the operation of the turret-moving means except when the plunger which causes the movement of the column is at its highest position. In other words, the mechanism is such that the turret cannot be turned accidentally when a column is only partially dispensed.

The machine further includes various novel features of construction and combinations and arrangements of parts, all of which will be more fully hereinafter described and pointed out in the claims.

In the accompanying drawings—

Fig. 2 is a fragmentary view in top plan with the cover of the receptacle removed;

Fig. 3 is a fragmentary bottom plan view with the parts in the position shown in Fig. 1;

Fig. 6 is a fragmentary view in sectional elevation of the interior of the machine looking toward the front thereof;

Fig. 7 is a fragmentary detail view in elevation illustrating the rack-locking means in released position;

Fig. 8 is a view in sectional plan on the line 8—8 of Fig. 7;

Fig. 9 is a fragmentary view in elevation of the rack bar;

Fig. 10 is a fragmentary view in vertical section on the line 10—10 of Fig. 1;

Fig. 11 is a bottom plan view of Fig. 10;

Fig. 12 is a fragmentary view in vertical section on the line 12—12 of Fig. 6;

Fig. 15 is a fragmentary detail perspective view illustrating the shaft 77 and the parts adjacent thereto.

Figure 1:
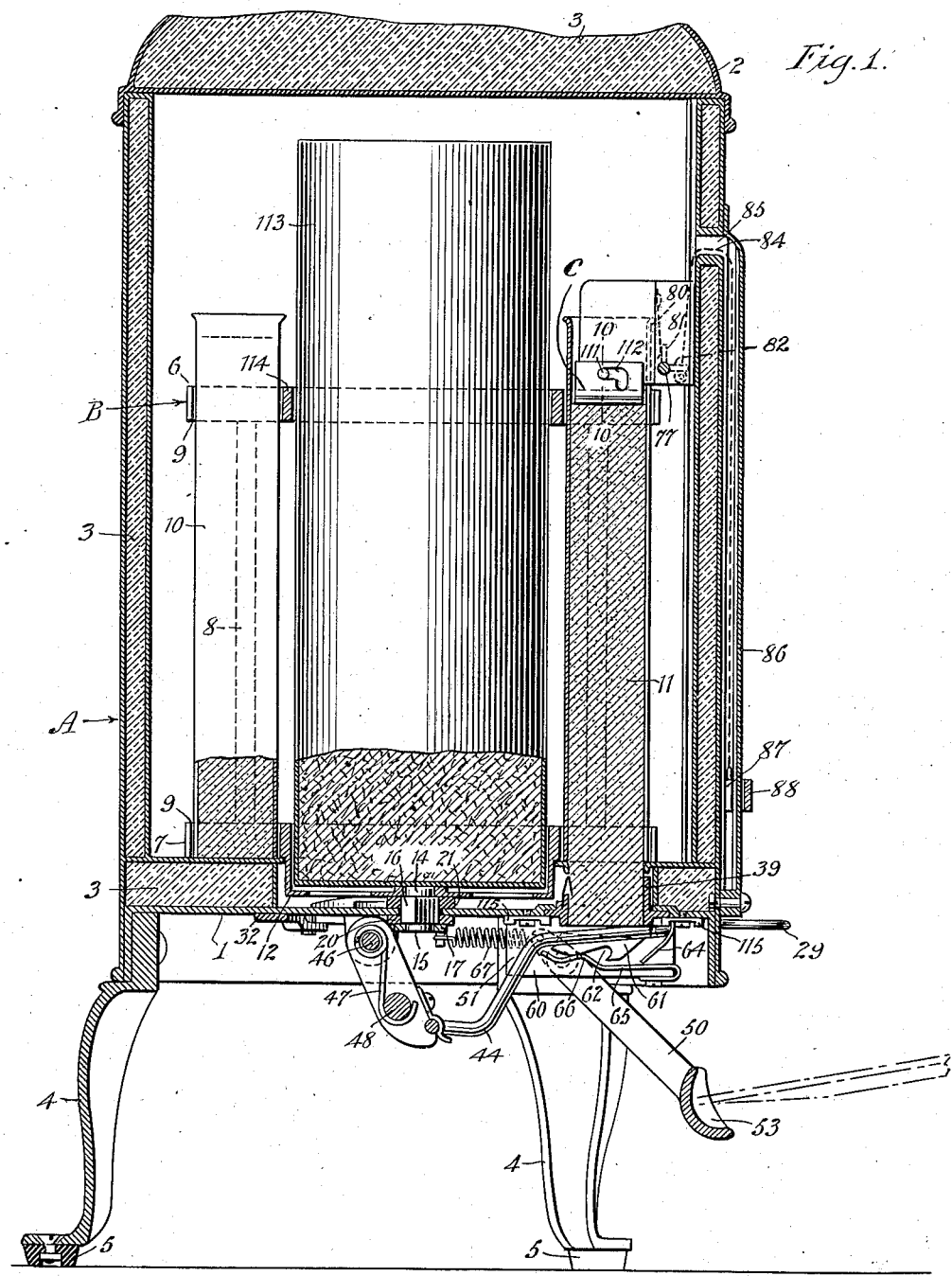
Figure 1 is a view mainly in vertical section through the machine, some parts being broken away and in elevation.

Our improved machine includes a casing or receptacle A, which is preferably of general cylindrical form having a bottom 1 and a removable cover 2 at the top thereof. The walls of the receptacle or casing, as well as the bottom 1 and cover 2, are hollow and are filled or packed with any suitable insulation 3. The receptacle A is supported at the desired elevation by means of any desired number of feet 4 secured to the lower portion of the receptacle, and these feet are preferably provided with rubber or other cushions 5 to contact with the table, shelf, or other device on which they are supported.

A rotary turret, indicated generally by the reference character B, is removably mounted in the receptacle and constitutes upper and lower castings 6 and 7, respectively, connected and spaced by vertical rods 8. The castings 6 and 7 provide rectangular openings 9 for the reception of channel-like containers 10, which are readily removable from the turret. The containers 10 are of general rectangular shape in cross section, open at their outer portions, as shown most clearly in Fig. 2 of the drawings, and they receive and support bars or columns of butter 11 in vertical position and allow the butter to be fed downwardly when in proper dispensing position, as will more fully hereinafter appear.

The lower casting or frame 7 has a central depressed portion 12 circular in plan, and this depressed portion is of skeleton formation resembling a wheel, as seen most clearly in Fig. 2 of the drawings. This depressed portion has a central hub 13 which turns freely on the cylindrical upper end 14 of a vertical stud 15. The stud 15 is angular at its intermediate portion, as shown at 16, and the angular portion turns freely in an opening in the bottom 1 large enough to permit a rotary movement. The lower end of the stud 15 is supported in a plate 17 secured to the under face of the bottom 1.

Radiating from the hub 13 are a circular series of spokes 18, which are engaged by a gravity pawl 19 supported on an arm 20, the hub 21 of which has an angular opening receiving the angular portion 16 of the stud 15 and resting upon the bottom 1. This pawl 19 is positioned transversely of the arm 20 and has on its under face a lug 22 intermediate its ends, which is positioned in an opening 23 in the arm 20. The longer heavier end 24 of the pawl rests normally upon the bottom 1, while the shorter, lighter end of said pawl has a shoulder 25 normally engaging one of the spokes 18. A fixed stop 26 on the bottom 1 limits the circular movement of the pawl so that when the arm 20 is swung a distance equal to the space between the spokes it will cause the turret to turn a distance equal to the distance between two butter receptacles 10, and the end of the pawl will strike the stop 26. A return movement of the arm 20 will move the pawl under a spoke 18 and the cam action of such engagement will cause the pawl to pivot until it reaches its extreme retrograde position, where it will be in such a position as to allow the shorter, lighter end of the pawl to rise and position the shoulder 25 back of the next spoke 18. This movement of the arm 20 to cause a partial turning movement of the turret is brought about through the medium of a sliding bar 27 mounted to slide in a suitable guide 28 and having a finger hold 29 at its free end projected outside of the casing A. The inner end of this bar 27 has a notch 30 in one edge receiving a pin 31 on a curved crank arm 32. This crank arm 32 has an angular opening receiving the angular portion 16 of the stud 15 and located against the face of the bottom 1 between said bottom and the stud supporting plate 17. The movement of the arm 32 in one direction is limited by a stop pin 49 on the bottom 1.

It will be noted that by an outward movement of the bar 27, the stud 15 can be turned a distance to turn the turret, and the inward movement of the bar 27 will cause the pawl 19 to be moved back to engage another spoke, ready for a repeated operation. The bar 27, however, is normally held against movement by means of a rod 33 which projects through the bottom 1 and into an opening 34 in the bar 27. The rod 33, located against the inner face of the casing A, has an angular bend 35 therein acting as a shoulder or stop to engage the bottom of the casing and limit the downward movement of the rod. The upper portion of this rod is guided in its longitudinal movement by a bracket 36 fixed to the interior of the casing, and a laterally projecting arm 37 is provided on the upper end of the rod and securely clamped thereon by a nut 38 screwed on to the end of the rod. The purpose of this arm will more fully hereinafter appear.

In the bottom 1 of the casing A a die 39 is located and above which a bar 11 of butter in one of the receptacles 10 is in alignment or registry, and through this die the lower end of the bar of butter is projected. Normally, however, the bar of butter is flush with the lower face of the die, and to hold the bar from accidental movement in the die, at least three of the walls of the die constitute springs 40. These springs are in reality thin metal plates turned over at their upper ends and projecting inwardly and downwardly so that while the butter can be forced through the die these spring members will hold it against undue movement. On the lower face of the die below the bottom 1, longitudinal and transverse integral webs 41 and 42 outline the lower end of the die opening and constitute a surface or surfaces over which a wire cutter 43 is movable to cut off a section of butter projecting through the die. The die is removably held in the opening in the bottom 1 of the casing A by means of a pair of turn buttons 115 connected to the bottom 1, as clearly shown in Fig. 3 of the drawings. The wire cutter 43 extends across the open end of a U-shaped cutter frame 44, one end of said frame being supported in crank arms 45 mounted on a shaft 46. The shaft 46 has a coil spring 47 around the same with one end of said spring engaging a cross pin 48 connecting the arms 45 and the other end of said spring engaging the bottom of the casing, so that when said arms are forced rearwardly the spring 47 is put under tension and when permitted will throw the arms forwardly to move the cutter frame 44 forwardly to sever a section or pat of butter projecting through the die. This rearward movement of the arms 45 and the cutter frame is brought about through the medium of an improved linkage which will now be explained.

Figure 4:
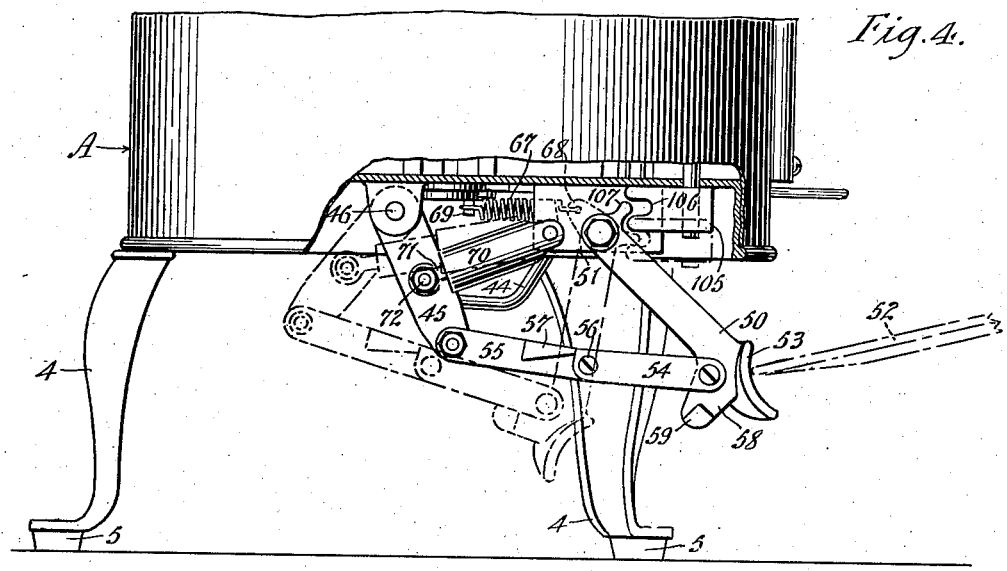
Fig. 4 is a sectional elevation of the lower portion of the machine showing the initial position of the parts as indicated in Figs. 1 and 3 of the drawings.

A U-shaped member 50, which for convenience of description we shall term a trigger, is pivotally connected at the ends of its arms to fixed supports 51 on the bottom 1 (see Figs. 3 and 4), permitting the free end of the trigger to swing inwardly and outwardly. This free end of the trigger is somewhat enlarged and curved to conform more or less to the general contour of a plate, such as illustrated in dot-and-dash lines at 52, so that the edge of this plate may be forced against the curved enlargement 53 of the trigger to move the same inwardly and cause a pat of butter to be cut off and deposited on the plate, as will now be explained.

One arm of the trigger 50 is pivotally connected by a pair of links 54 and 55 with one of the crank arms 45. These links 54 and 55 are pivotally connected, as shown at 56, and a block or lug 57 on the link 55 normally engages the end of the link 54 to prevent a downward pivotal movement of the linkage connection. The trigger 50 is formed with an extension 58 projecting below the plane of link 54, and a finger 59 on said extension is adapted to engage the under face of the link 54 when the trigger is forced inwardly the necessary distance. A downwardly projecting web or wall 60 is secured to the bottom 1 and has fixed thereto a cam block 61. This cam block 61 has a notch 62 in its lower face and its upper face is spaced substantially parallel to the plane of the bottom of the die. A finger 63 at the forward end of the cutter frame 44 projects at right angles to said cutter frame and is movable around the cam block 61.

It is guided in its movement by a spring tongue 64 at the forward end of the wall 60 and by a spring 65 at the lower portion of the wall. This spring 65 has an offset portion 66 intermediate its ends and located in proximity to the notch 62.

The operation of the cutting mechanism is as follows: When a plate 52 is pressed against the trigger 50, it forces the trigger inwardly and in so doing it forces the free ends of the arms 45 inwardly through the medium of the links 54 and 55, thus drawing the cutter frame rearwardly, and as the finger 63 of the cutter frame rides around the front and lower face or edge of the block 61, the wire cutter 43 is caused to move downwardly as well as rearwardly, and the purpose of the notch 62 and the offset portion of the spring 66 is to cause the finger 63 to be forced into the notch 62 should the trigger be moved only partially and not throughout its extreme movement. In other words, this mechanism makes it impossible to partially operate the trigger. It must be moved through its complete arc or else its operation will be stopped by the engagement of the finger 63 in the notch 62. A continued movement of the trigger will bring the finger 59 against the under edge of the link 54 and as the trigger reaches its extreme inward movement the finger 59 will cause the pivotal connection 56 to move upwardly, thus breaking the linkage. At this point the cutter frame has moved around the rear end of the block 61 and the free end of said frame is snapped upwardly by the action of the free end of the spring 65 against the cutter frame. When this break of the linkage takes place, the spring 47 throws the arms 45 forwardly and moves the cutter frame and cutter rapidly across the lower end of the die 39 to sever a pat of butter, which falls on to the plate 52. When the trigger is released it will be returned to its forward position by means of a coil spring 67 connecting an extension 68 on one of the trigger arms with a fixed part 69 on the bottom of the casing. To reduce noise to a minimum, a dash pot 70 is pivotally connected to the bottom of the casing and its movable member 71 is pivotally connected to one of the arms 45, as shown at 72. This inward movement of the trigger 50 not only operates to set the cutter for operation, but it also causes a downward movement of the bar of butter 11 above the die so as to project a portion of the bar of butter below the die. This operation is effected by mechanism which will now be described.

In the normal operation of the machine, a plunger, indicated generally by the reference character C, rests upon the upper end of the bar or column of butter 11, which is in alignment with the die 39. This plunger is fixed to the lower end of a web 73 which, in the particular construction illustrated, comprises a pair of plates. The plates at one end are flared outwardly in box-like form and flanged as shown at 74, and are movable in a channel 75 secured to the inner face of a vertical wall of the casing so that while the plunger is free to move vertically it is held against movement in any other direction. This box-like formation of the plates constituting the web, forms what may be termed a housing 76 through which a shaft 77 projects, and on the outer free end of this shaft 77 a ratchet pawl 78 is provided, which is integral with the shaft and adapted to engage a rack bar 79. The pawl 78 is held in normal engagement with the rack bar by means of a spring 80 in the housing 76 engaging an arm 81 on the shaft 77. This shaft 77 also has a pair of parallel arms 82 at approximately a right angle to the arm 81, and under these arms 82 a roller cross head 83 is located and movable freely in the housing. A chain 84 is connected at one end to the cross head and extends through an opening 85 in the wall of the casing A, and then down the outside of the casing under a covering plate 86. This covering plate is slotted in one side to accommodate a finger 87 on an indicator 88, the finger 87 being secured to the outer end of the chain 84. The rack bar 79 constitutes a strip or length of metal having openings 89 therein spaced apart and adapted to receive the pawl 78, and it is, of course, to be understood that these openings may be spaced in the rack bar to suit conditions. The rack bar is removably held in a rack bar assemblage D, which is constituted of a metal plate 90 movable against the inner face of the casing and having along one edge an inturned flange 91 to receive one longitudinal edge of the rack bar and provided with a short flange 92 at its lower edge against which the lower end of the rack bar is positioned. The rack bar 79 at its other longitudinal edge, is formed with a turned-over portion constituting a tube 93 receiving a vertical rod 94, which is pinned or otherwise secured in the tube, as shown at 95. A finger 96 on the tubular portion of the plate adjacent its upper end, is shaped to receive one edge of the rack bar 79, and the upper portion of said plate is also provided with an inturned flange 97 to engage an edge of the rack bar. A bracket arm 98 is provided on the flanged portion to receive the rod 94 and be secured thereto. 99 represents a bearing bracket secured to the inner face of the casing and in which the rod 94 has vertical movement. The flanges 91 and 97 adjacent the upper end of the assemblage D, are notched, as shown at 100, and the rack bar 79 is likewise notched at its edges, as shown at 101. These notches 100 and 101 are in registry and are adapted to receive therein lugs 102 on a locking arm 103. This locking arm 103 is pivotally mounted at one end on a reduced upper end of the rod 94 and a thumb nut 104 is screwed on to the upper end of the rod 94, so as to clamp this locking arm 103 either in its position to secure the rack bar in the rack bar assemblage, or to permit said locking bar to be swung away from such position, such as indicated in Figs. 7 and 8 of the drawings to permit the rack bar to be removed and replaced.

Figure 5:
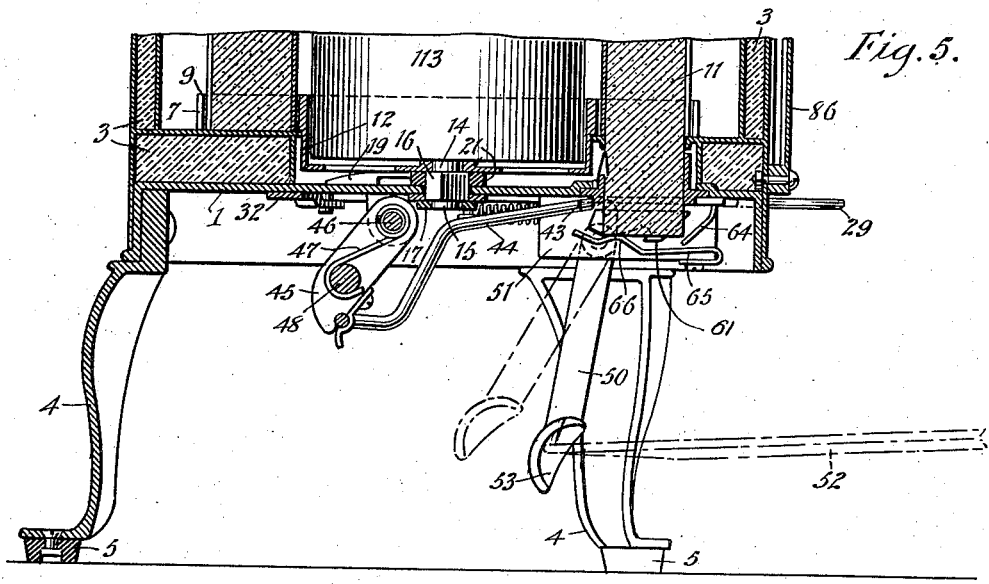
Fig. 5 is a view in vertical section through the center of the lower portion of the machine showing the position of the mechanism with the operation of cutting a pat or section of butter from the column partially completed.
Figure 13:
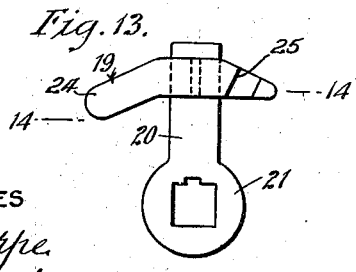
Fig. 13 is a detail view showing the rocking pawl and operating arm for turning the turret.
Figure 14:
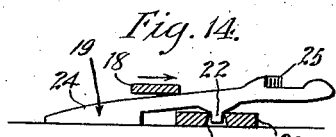
Fig. 14 is a view in section on a slightly larger scale on the line 14—14 of Fig. 13.

On the lower edge of the rod 94 which projects through the bottom 1 of the casing A, a block 105 is secured, and this block 105 has a notch 106 in one end receiving a finger 107 on an arm of the trigger 50 so that as this trigger 50 is swung inwardly it will draw the block 105 downwardly, drawing the rack assemblage downwardly, and imparting a downward movement to the plunger C to force the bar of butter through the die 39 and project a portion of said bar below the die to be severed, as shown clearly in Fig. 5 of the drawings.

It has been found that a metal surface against the end of the bar of butter tends to stick to the butter, and to obviate any sticking of the plunger to the end of a bar of butter, we provide the plunger with means for clamping a sheet of Cellophane, paper, or the like, 116 under the bottom of the plunger, and the plunger is preferably formed with a plurality of openings 108 for the admission of air back of the sheet. This paper-holding means constitutes a bifurcated head 109 located above the plunger C and having flanges 110 located at opposite sides of the web 73. A cross pin 111 extends through the web 73 and through L-shaped cam slots 112 in the flanges 110. These slots 112 permit the paper-clamping device 109 to be moved upwardly away from the upper edge of the plunger C, and allow the ends of the piece of paper 116 to be inserted over the upper face of the plunger. When in this position the holding device 109 is moved downwardly on to the plunger, clamping the ends of the paper around the same. While we refer to the covering as paper, it is obvious that it may be any suitable material.

We have above referred to an arm 37 on the upper end of the rod 33. This arm 33 is positioned over the plunger C so that when said plunger is raised to its highest position it will contact with the arm 37 and move the rod 33 upwardly, releasing said rod from its engagement with the hole or opening 34 in the bar 27 so as to allow the turret to be turned by the manipulation of said bar as above explained. When the plunger moves downwardly the rod 33 will fall into its locking position and it is then impossible to turn the turret until the plunger is again elevated to its highest position. This can be accomplished by a manual movement downwardly of the indicator 88, which, through the medium of the chain 84, causes the shaft 77 to turn, releasing the pawl 78 from engagement with the rack 79 and allowing the plunger C to be raised as desired.

It will be noted that with our improved machine, apart from the manual turning of the turret, the operation thereof is performed solely and completely by the inward movement of the trigger 50 when a plate is pressed thereagainst, and this movement of the trigger 50 not only retracts the cutting frame to a set position but it causes the plunger C to be moved downwardly to project the bar of butter below the die, and when the trigger reaches the desired position the cutter is released and springs forward, cutting off the pat of butter and allowing the same to drop on to the plate. Thus an operator can secure a pat of butter by holding the plate with one hand, leaving the other hand free for the handling of other articles.

It is also apparent that all parts of the apparatus or machine are readily removable so that they can be thoroughly cleansed and replaced, and while, of course, we do not limit ourselves to any particular means for maintaining the butter and interior of the apparatus at the desired temperature, we have illustrated and can use a simple form of tank or receptacle 113 which is projected through an opening 114 in the upper casting 6 of the turret B and rests at its lower end in the depressed portion 12 of the lower casting 7. This tank or receptacle 113 may contain ice or any other refrigerant and it is also readily removable and replaceable.

While we have illustrated what we believe to be the preferred embodiment of our invention, it is to be distinctly understood that various slight changes may be made with regard to the form and arrangement of parts without departing from our invention, and hence we do not limit ourselves to the precise details set forth but consider ourselves at liberty to make such changes and alterations as fairly fall within the spirit and scope of the claims.

We claim:

1. A butter dispenser, including a casing, means for projecting a bar of butter through the bottom of the casing, a cutter frame, a cutter in said frame, a trigger adapted to move the cutter frame and cutter both downwardly and rearwardly, a spring adapted to force the cutter frame and cutter forwardly to cut off a section of the bar of butter, a finger on the cutter frame, and a fixed cam block around which the finger moves to control the path of movement of the cutter.

2. A butter dispenser, including a casing, means for projecting a bar of butter through the bottom of the casing, a cutter frame, a cutter in said frame, a trigger adapted to move the cutter frame and cutter both downwardly and rearwardly, a spring adapted to force the cutter frame and cutter forwardly to cut off a section of the bar of butter, a finger on the cutter frame, a fixed cam block around which the finger moves to control the path of movement of the cutter, and resilient means engaging the finger and guiding the same around the block.

3. A butter dispenser, including a casing, means for projecting a bar of butter through the bottom of the casing, a cutter frame, a cutter in said frame, a trigger adapted to move the cutter frame and cutter both downwardly and rearwardly, a spring adapted to force the cutter frame and cutter forwardly to cut off a section of the bar of butter, a finger on the cutter frame, a fixed cam block around which the finger moves to control the path of movement of the cutter, and resilient means engaging the finger and guiding the same around the block, said block having a notch in its lower face to receive the finger and prevent forward movement of the cutter until it completes its normal rearward movement.

4. A butter dispenser, including a casing, means for projecting a bar of butter through the bottom of the casing, a cutter frame, a cutter in said frame, a pivoted trigger, spring-pressed arms connected to the cutter frame and adapted to move the same forwardly, a pair of pivoted links connecting the trigger and one of said arms, a block on one of said links holding the links against pivotal movement in relation to each other, and a finger on the trigger adapted when the trigger is moved to its extreme rearward position to engage one of the links and cause the links to pivot relative to each other and permit the spring-pressed arms to force the cutter frame and cutter forwardly to sever a section from the bar of butter projected through the bottom of the casing.

5. A butter dispenser, including a casing, a rotary turret in the casing, a series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, a plunger adapted to force the bar of butter through the die, said turret having a central rotary bearing and radial spokes in the bottom thereof, a crank arm under the turret, a gravity-operated pawl supported on the crank arm and operatively engaging the spokes, a second crank arm operatively connected with the first-mentioned crank arm, and a sliding bar projecting beyond the wall of the casing and operatively engaging the last-mentioned crank arm to swing the same a predetermined distance to cause the turret to turn a distance equal to that between the butter receptacles.

6. A butter dispenser, including a casing, a rotary turret in the casing, a series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, a plunger adapted to force the bar of butter through the die, said turret having a central rotary bearing and radial spokes in the bottom thereof, a crank arm under the turret, a gravity-operated pawl supported on the crank arm and operatively engaging the spokes, a second crank arm operatively connected with the first-mentioned crank arm, a sliding bar projecting beyond the wall of the casing and operatively engaging the last-mentioned crank arm to swing the same a predetermined distance to cause the turret to turn a distance equal to that between the butter receptacles, a vertical movable rod in the casing normally positioned in an opening in the bar preventing movement of the latter, and an arm on said rod above the plunger whereby when said plunger is moved to its highest position it will elevate the rod and release the bar and permit a turning movement of the turret.

7. A butter dispenser, including a casing, means supporting a bar of butter vertically in the casing, said casing having a die in the bottom thereof, a plunger adapted to engage the upper end of the bar of butter to force the same through the die, a rack carrier mounted to reciprocate freely in the casing, a removable rack bar, means below the casing for cutting a section of butter projected through the die and also for reciprocating the rack bar carrier and rack bar, a web secured to the plunger, a box-like housing or casing fixed to the web, a guide in the casing guiding the movement of the housing and plunger, a shaft extending through the housing, an arm at the end of said shaft constituting a pawl engaging the rack, arms on the shaft in the housing at right angles to each other, a spring in the housing engaging one of said arms and resiliently holding the pawl in operative position, a device under the other arm and a chain connected to said device and extending through an opening in the wall of the casing above the housing, and a movable indicator outside of the casing connected with the outer end of said chain.

8. A butter dispenser, including a casing, means supporting a bar of butter vertically in the casing, said casing having a die in the bottom thereof, a plunger adapted to engage the upper end of the bar of butter to force the same through the die, a rack carrier mounted to reciprocate freely in the casing, a removable rack bar, means below the casing for cutting a section of butter projected through the die and also for reciprocating the rack carrier and rack bar, a web secured to the plunger, a box-like housing or casing fixed to the web, a guide in the casing guiding the movement of the housing and plunger, a shaft extending through the housing, an arm at the end of said shaft constituting a pawl engaging the rack, arms on the shaft in the housing at right angles to each other, a spring in the housing engaging one of said arms and resiliently holding the pawl in operative position, a device under the other arm and a chain connected to said device and extending through an opening in the wall of the casing above the housing, a movable indicator outside of the casing connected with the outer end of said chain, a longitudinally slotted cover over the outer run of the chain, and a finger on the indicator projecting through the slot and secured to the chain.

9. A butter dispenser, including a casing, means in the casing for supporting a bar of butter in vertical position, said casing having a die in its bottom through which the butter is projected, a plunger engaging the upper end of the bar, means for cutting a section of butter below the die, means for causing the plunger to move downwardly a given distance at each operation of the cutting means, said plunger having a movable plate above the same adapted to clamp a sheet of material around the face of the plunger, flanges on said plate having slot-and-pin connection with the plunger and said plunger having openings therein for the admission of air to free the sheet from contact with the bar of butter.

10. A butter dispenser, including a casing, feet supporting the casing at an elevation, a die in the bottom of the casing, means in the casing for feeding a bar of butter through the die, and a cutter below the die and adapted to sever a section of butter projected through the die, said die having spring walls with downwardly-turned edges past which the bar of butter is forced and held thereby against accidental downward movement.

11. A butter dispenser, including a casing, means in the casing for supporting a bar of butter in vertical position, a die in the bottom of the casing through which the bar of butter is adapted to be projected, a plunger in the casing operatively engaging the bar of butter, manually operable means outside of the casing operatively connected with the plunger, cutting mechanism below the casing adapted to sever the projected section of butter at the die, and means in the casing operatively connecting the cutting mechanism with the plunger whereby said cutting mechanism and plunger are operated successively, said cutting mechanism being constituted of a spring-pressed cutting device movable across the die and a trigger adapted to move said cutting device to set position when engaged by a plate to receive the cut section of butter thereon.

12. A butter dispenser, including a casing, a rotary turret in the casing, a circular series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, a plunger adapted to force the bar of butter through the die, means for turning the turret to bring the receptacles successively into register with the die, locking means preventing the operation of the last-mentioned means, and means engaged by the plunger when in its highest position to release the locking means.

13. A butter dispenser, including a casing, a rotary turret in the casing, a circular series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, means for turning the turret to bring the receptacles successively into register with the die, a vertically movable locking rod normally engaging said last-mentioned means and preventing the operation of the same, and an arm on said rod in the path of movement of said plunger so that when the plunger is elevated to its highest position it will engage the arm and elevate the rod to its unlocking position.

14. A butter dispenser, including a casing, a rotary turret in the casing, a circular series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, a plunger adapted to force the bar of butter through the die, means for turning the turret to bring the receptacles successively into register with the die, locking means preventing the operation of the last-mentioned means, means engaged by the plunger when in its highest position to release the locking means, and means extending outside of the casing indicating the position of the plunger and permitting manual movement of the plunger to elevate the same.

15. A butter dispenser, including a casing, a rotary turret in the casing, a circular series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, means for turning the turret to bring the receptacles successively into register with the die, a vertically movable locking rod normally engaging said last-mentioned means and preventing the operation of the same, an arm on said rod in the path of movement of said plunger so that when the plunger is elevated to its highest position it will engage the arm and elevate the rod to its unlocking position, and means extending outside of the casing indicating the position of the plunger and permitting manual movement of the plunger to elevate the same.

16. A butter dispenser, including a casing, a rotary turret in the casing, a circular series of channel-like receptacles mounted in the turret and adapted to support bars of butter in vertical position resting on the bottom of the casing, a die in the bottom of the casing with which one of the bars of butter is adapted to register and be projected through the same, cutting means below the casing adapted to sever a section of butter projected through the die, a plunger adapted to force the bar of butter through the die, means for turning the turret to bring the receptacles successively into register with the die, locking means preventing the operation of the last-mentioned means, means engaged by the plunger when in its highest position to release the locking means, means extending outside of the casing indicating the position of the plunger and permitting manual movement of the plunger to elevate the same, and means operated by the cutting means to force the plunger downwardly a predetermined distance at each operation of the cutting means.

IRENE GRANT JOHNSON.
WINFRED N. LURCOTT.